United States Patent [19]

Shimada et al.

[11] Patent Number: 4,678,708
[45] Date of Patent: Jul. 7, 1987

[54] MAGNETIC RECORDING MEDIUM

[75] Inventors: Shigeru Shimada, Saku; Masaharu Nishimatsu, Komoro; Hiroyuki Arioka, Saku; Yuichi Kubota, Komoro, all of Japan

[73] Assignee: TDK Corporation, Tokyo, Japan

[21] Appl. No.: 807,825

[22] Filed: Dec. 11, 1985

Related U.S. Application Data

[63] Continuation-in-part of Ser. No. 804,223, Nov. 27, 1985, abandoned, which is a continuation of Ser. No. 645,043, Aug. 28, 1984, abandoned.

[30] Foreign Application Priority Data

Sep. 2, 1983 [JP] Japan ................... 58-160416

[51] Int. Cl.⁴ ............................................. G11B 5/702
[52] U.S. Cl. ..................................... 428/336; 427/44; 427/128; 252/62.54; 428/480; 428/483; 428/522; 428/694; 428/900
[58] Field of Search .................. 427/44, 128; 428/694, 428/900, 336, 480, 425.9, 522, 483; 360/134–136; 252/62.54

[56] References Cited

U.S. PATENT DOCUMENTS

| 4,368,239 | 1/1983 | Nakasima | 428/695 |
| 4,415,630 | 11/1983 | Kubota | 427/44 |
| 4,434,210 | 2/1984 | Nakajima | 428/405 |
| 4,476,035 | 10/1984 | Miyoshi | 428/694 |
| 4,559,265 | 12/1985 | Kubota | 428/694 |
| 4,601,947 | 7/1986 | Shimada | 428/694 |
| 4,603,081 | 7/1986 | Shimada | 428/694 |

FOREIGN PATENT DOCUMENTS 57-128711  8/1982  Japan .

Primary Examiner—Ellis P. Robinson
Attorney, Agent, or Firm—Wyatt, Gerber, Shoup, Scobey and Badie

[57] ABSTRACT

A magnetic recording medium, obtained by preparing a radiation-sensitive curing resin by modification of a copolymer of (A) vinyl chloride, (B) a vinyl carboxylate, (C) an unsaturated carboxylic acid and (D) an unsaturated carboxylic anhydride, containing 50 to 80% by weight of (A) based on the total of (A) and (B), 10 to 30% by weight of (D) based on the total of (C) and (D) and a total of 1 to 5 parts by weight of (C) and (D) based on 100 parts by weight of (A) and (B) and having an average polymerization degree of 100 of 400, and a magnetic powder thereby producing a magnetic paint, applying said magnetic paint to a non-magnetic substrate, and solidifying the resultant coating of paint on said substrate by exposure to radiation.

9 Claims, 1 Drawing Figure

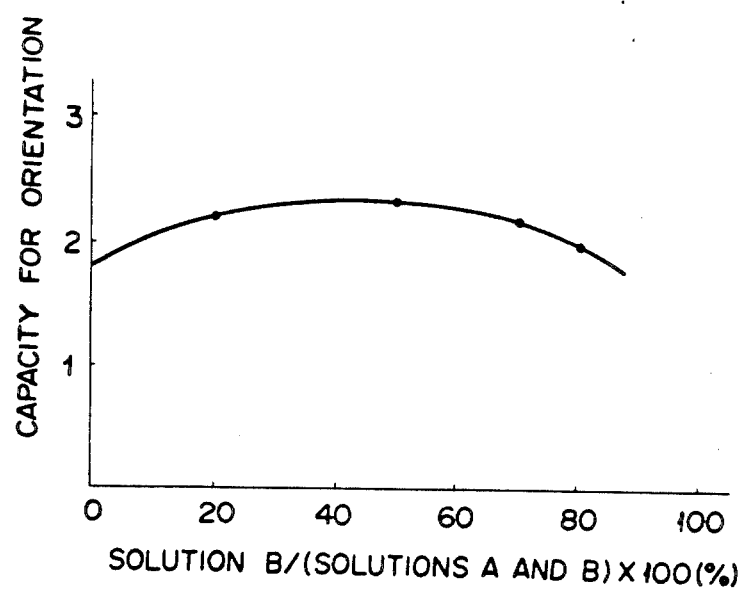

MAGNETIC RECORDING MEDIUM

RELATED APPLICATION

This application is a continuation in part of application Ser. No. 804,223, filed Nov. 27, 1985, now abandoned, which in turn is a continuation of application Ser. No. 645,043, filed Aug. 28, 1984, now abandoned.

BACKGROUND OF THE INVENTION

Field of the Invention

This invention relates to a magnetic recording media. More particularly this invention relates to a magnetic recording media with excellent surface and desirable electromagnetic properties, obtained by preparing a radiation-sensitive curing resin by modification of a four-component copolymer containing vinyl chloride, a vinyl carboxylate, an unsaturated carboxylic acid and an unsaturated carboxylic anhydride; blending the resin with another polymer and a magnetic powder thereby producing a magnetic paint; applying the magnetic paint as a coating to a non-magnetic substrate; and solidifying the applied coating of paint with radiation.

Today, magnetic recording media have found extensive utility in various forms such as magnetic tapes for use in audio devices and video devices, magnetic disks for use in electronic computers and word processors, and magnetic cards for various household applications. Heretofore in the production of such a magnetic recording media, it has been customary to use a radiation-sensitive curing resin as a binder for a formulation containing magnetic powder, deposit the resultant magnetic paint on a substrate, and expose the applied coating of the paint on the substrate to radiation to cross link and polymerize the coating.

A magnetic redcording medium using the aforementioned radiation-sensitive curing resin as the binder, however, suffers from the disadvantage that it has a high frictional coefficient and is deficient in surface properties such as gloss, capacity for orientation and electromagnetic property. For the purpose of eliminating this disadvantage, the inventors have already developed a resin solution for magnetic paint using as a main component therefor a copolymer, 100 to 400 in average polymerization degree, which is a four-component copolymer of (A) vinyl chloride, (b) a vinyl carboxylate, (C) an unsaturated carboxylic acid and (D) an unsaturated carboxylic anhydride, containing 50 to 80% by weight of (A) based on the total of (A) and (B), 10 to 30% by weight of (D) based on the total of (C) and (D) and a total of 1 t 5 parts by weight of (C) and (D) based on 100 parts by weight of (A) and (B) (Japanese Patent Laid Open No. SHO 57(1982)-128,711). A magnetic recording medium produced by using this resin solution, however, is still deficient in frictional coefficient, gloss, capacity for orientation and electromagnetic property.

An object of this invention, therefore, is to provide an improved magnetic recording medium. Another object of this invention is to provide a magnetic recording medium which has a low frictional coefficient and excels in surface property, capacity for orientation, and electromagnetic property.

SUMMARY OF THE INVENTION

The objects described above are accomplished by providing magnetic recording media which are obtained by preparing a radiation-sensitive curing resin by modification of a copolymer of (A) vinyl chloride, (B) a vinyl carboxylate, (C) an unsaturated carboxylic acid and (D) an unsaturated carboxylic anhydride, containing 50 to 80% by weight of (A) based on the total of (A) and (B), 10 to 30% by weight of (D) based on the total of (C) and (D), and a total of 1 to 5 parts by weight of (C) and (D) based on 100 parts by weight of (A) and (B) and having an average polymerization degree of 100 to 400, mixing the resin with at least one other polymer and a magnetic powder thereby producing a magnetic paint, applying the magnetic paint to a non-magnetic substrate, and solidifying the resultant coating of paint on the substrate by exposure to radiation.

BRIEF DESCRIPTION OF THE DRAWING

The drawing is a graph showing the relation between the ratio of the components of binder and the capacity for orientation obtained with a typical magnetic recording medium of this invention.

PREFERRED EMBODIMENT OF THE INVENTION

The radiation-sensitive curing resin used for this invention is prepared by modifying a copolymer comprising (A) vinyl chloride, (B) a vinyl carboxylate, (C) an unsaturated carboxylic acid and (D) an unsaturated carboxylic anhydride and having an average polymerization degree in the range of 100 to 400. Concrete examples of the monomers to be copolymerized with (A) vinyl chloride in the manufacture of the aforementioned copolymer will be cited. Examples of (B) the vinyl carboxylate include vinyl acetate, vinyl propionate, and Vinyl Versatate (product of Shell), with vinyl acetate preferred over others. Examples of (C), the unsaturated carboxylic acid include maleic acid, itaconic acid, fumaric acid, acrylic acid and methacrylic acid, with maleic acid preferred over others. Examples of (D), the unsaturated carboxylic anhydride include maleic anhydride and itaconic anhydride, with maleic anhydride being preferred.

The aforementioned copolymer contains (A) vinyl chloride in an amount from 50 to 80% by weight, preferably 60 to 80% by weight based on the total amount of (A) vinyl chloride and (B) the vinyl carboxylate. If the amount of (A) vinyl chloride exceeds 80% by weight based on the aforementioned total, the resin solution resulting from the mixing of the radiation-sensitive curing resin with the magnetic powder acquires a high viscosity so that the resultant magnetic paint, preparatory to application to the substrate, must have its viscosity lowered by the use of a large volume of solvent. If the amount of (A) vinyl chloride is less than 50% by weight based on the aforementioned total, then the surface of the applied coating of the magnetic paint has insufficient strength such that the applied coating may peel off or induce the phenomenon of blocking. The copolymers contain (D) the unsaturated carboxylic anhydride in an amount from 10 to 30% by weight, preferably 10 to 20% by weight, based on the total amount of (C) the unsaturated carboxylic acid and (D) the unsaturated carboxylic anhydride. If the amount of (D) the unsaturated carboxylic anhydride based on the aforementioned total exceeds 30% by weight, the dispersibility of the magnetic powder in the radiation-sensitive curing resin is not sufficient. If the amount of (D) the unsaturated carboxylic anhydride is less than 10% by weight, the reaction involving a radiation-sensitive curing resin proceeds so fast as to shorten the pot life of the produced magnetic paint. The aforementioned copolymer contains (C) the unsaturated carboxylic acid and (D) the unsaturated carboxylic anhydride in a total amount from 1 to 5 parts by weight, preferably 1 to 3 parts by weight, based on 100 parts by weight of (A) vinyl chloride and (B) the vinyl carboxylate. If the total amount is less than 1 part by weight, the reactivity with a radiation-sensitive curing resin is intolerably low. If it exceeds 5 parts by weight, then the reactivity with the radiation-sensitive curing resin is so high as to shorten the pot life of the magnetic paint.

The average polymerization degree of the aforementioned four-component copolymer is from 100 to 400 for the following reason. If the average polymerization degree is less than 100, the applied coating of the magnetic paint on the substrate has too weak a surface for the produced magnetic recording medium to be practicable. If it exceeds 400, the magnetic paint has too high a viscosity to permit application of the magnetic paint in a sufficiently high concentration. In view of the condition of the surface of the applied coating of magnetic paint and the condition of the magnetic paint, the aforementioned copolymer is desired to have an average polymerization degree particularly in the range of 200 to 400.

The aforementioned copolymer is subjected to modification to acquire sensitivity to radiation. Specifically, this sensitization is effected by incorporating into the molecules of the copolymer a radiation polymerizable unsaturated compound containing a double bond uch as the acrylic double bond contained in acrylic acid, methacrylic acid and esters thereof, the allylic double bond contained in diallyl phthalate, or the unsaturated double bond contained in maleic acid and maleic acid derivatives. Such compounds are cured by crosslinking or polymerization on exposure to radiation. Any other unsaturated double bond meeting the requirement that it is polymerized by cross-linking upon exposure to radiation can be effectively utilized for the purpose of this invention.

In the present invention, a mixture of the aforementioned radiation-sensitive curing copolymer resulting from the modification described above with at least one other polymer is used as a vehicle. In this case, the amount of the aforementioned radiation-sensitive curing copolymer is in the range of 10 to 80% by weight, preferably 20 to 70% by weight, based on the total amount of the radiation-sensitive curing copolymer and the other polymer. If the proportion of the aforementioned radiation-sensitive curing copolymer in the mixture is less than 10% by weight, the degree of orientation is not sufficient. If the proportion exceeds 80% by weight, the density of cross-linking is too high and so is the rigidity of the applied coating. Consequently, the applied coating itself becomes brittle. Examples of the other polymers which may be mixed with the aforementioned radiation-sensitive curing copolymer are curing resins not sensitive to radiation and radiation-sensitive other than those radiation-sensitive, polymerizable, unsaturated polymers enumerated above.

Concrete examples of the curing resin not sensitive to radiation include the following compounds.

(1) Vinyl chloride type copolymers

Vinyl chloride-vinyl acetate-vinyl alcohol copolymer, vinyl chloride-vinyl alcohol copolymer, vinyl chloride-vinyl alcohol-vinyl propionate copolymer, vinyl chloride-vinyl acetate-maleic acid copolymer, and vinyl chloride-vinyl acetate-terminal OH side chain alkyl group copolymer. Commercially available vinyl chloride type copolymers are produced by Union Carbide Corp. and marketed under trademark designations VROH, VYNC, VYEGX and VERR, for example.

(2) Saturated polyester resins

Saturate polyester resins obtained by the reaction of such aromatic and saturated polybasic acids as phthalic anhydride, isophthalic acid, terephthalic acid, succinic acid, adipic acid and sebacic acid with such polyhydric alcohols as ethylene glycol, diethylene glycol, glycerol, trimethylol propane, 1,2-propylene glycol, dipropylene glycol, 1,3-butane diol, 1,4-butane diol, 1,6-hexane diol, pentaerthritol, sorbital, neopentyl glycol and 1,4-cyclohexane dimethanol. Resins obtained by modifying those saturated polyester resins mentioned above such as with $SO_3Na$ (Bylon 53S, for example) are also examples.

(3) Polyvinyl alcohol type resins

Polyvinyl alcohol, butyral resin, acetal resin, formal resin and copolymers thereof.

(4) Epoxy type resins

Epoxy resins obtained by the reaction of bisphenol A with epichlorohydrin or methyl epichlorohydrin (such as products of Shell Chemical marketed under trademark designations of Epikote 152, 154, 828, 1001, 1004, and 1007, products of Dow Chemical marketed under trademark designations of DEN 431, DER 732, DER 511, and DER 331, and products of Dainippon Ink And Chemicals, Inc. marketed under trademark designations of Epicron 400 and Epicron), phenoxy resins which are high polymer resins of the aforementioned epoxy (such as products of Union Carbide marketed under trademark designations of PKHA, PKHC and PKHH), and copolymers of brominated bisphenol A with epichlorohydrin (such as products of Dainippon Ink And Chemicals, Inc. marketed under trademark designations of Epicron 145, 152, 153 and 1120).

(5) Cellulose derivatives

Cellulose derivatives of varying molecular weights are also effectively used as thermoplastic components. Among other cellulose derivatives, nitrocellulose, cellulose acetobutyrate, ethyl cellulose, butyl cellulose and acetyl cellulose prove particularly desirable.

(6) Others

Polyfunctional polyester resins, polyether ester resins, polyvinyl pyrrolidone resins and derivatives thereof (such as vinyl pyrrolidone-ethylene copolymer), polyamide resins, polyimide resins, phenol resins, spiroacetal resins and hydroxyl group-containing acrylic and methacrylic resins are also usable for the purpose of the radiation-sensitizing modification.

Of the curing resins not sensitive to radiation enumerated above, those which are thermoplastic are preferred. In view of the compatability with the aforementioned radiation-sensitive curing copolymer, a vinyl chloride type copolymer is preferable. Further, the aforementioned four-component type copolymer in its unmodified form is the best choice from the viewpoint of compatibility.

Such other radiation-sensitive curing resin is obtained by modifying the aforementioned polymer of copolymer (exclusive of the aforementioned four-component copolymer of vinyl chloride-vinyl carboxylate-unsaturated carboxylic acid-unsaturated carboxylic anhydride) into a radiation-sensitive curing resin. This modification is effected, for example, by incorporation into the molecules of the polymer or copolymer a radiation polymerizable compound containing an unsaturated double bond such as the acrylic double bond contained in acrylic acid, methacrylic acid, and esters thereof, the allylic double bond contained in diallyl phthalate, or the unsaturated double bond contained in maleic acid and maleic acid derivatives which is cured by cross-linking or polymerization by exposure to radiation. This radiation-sensitive curing resin is a substitute for part of the aforementioned curing resin not sensitive to radiation and is used in a proportion such that the total amount of the radiation-sensitive curing resin will not exceed 80% by weight, preferably 70% by weight, of the aforementioned total amount of resins.

The substances so far described are part of the polymer other than the radiation sensitive modified four-component copolymer in accordance with the present invention.

Such a resin composition may be formed into an applied layer of paint having significantly increased toughness by incorporating therein a thermoplastic elastomer or prepolymer.

This incorporation of the elastomer or prepolymer becomes more effective when the elastomer or prepolymer is similarly modified for radiation-sensitization.

Examples of the elastomer or prepolymer usable advantageously for the purposes of this invention are as follows.

(1) Polyurethane elastomers, prepolymers and telomers

Polyurethane elastomers are particularly effective in terms of wear resistance and adhesiveness to polyethylene terephthalate film.

Examples of such urethane compounds are polyurethane elastomers, prepolymers and telomers formed of polycondensates of various isocyanates such as 2,4-toluene diisocyanate, 2,6-toluene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanatge, hexamethylene diisocyanate, isophorone diisocyanate, dicyclohexylmethane diisocyanate, Desmodur L and Desmodur N; linear saturated polyesters (such as polycondensates of polyhydric alcohols such as ethylene glycol, diethylene glycol, glycerol, trimethylol propane, 1,4-butane diol, 1,6-hexane diol, pentaerythritol, sorbitol, neopentyl glycol and 1,4-cyclohexane dimethanol with saturated polybasic acids such as phthalic anhydride, isophthalic acid, terephthalic acid, maleic acid, succinic acid and adipic acid); linear saturated polyethers (such as polyethylene glycol, polypropylene glycol and poly-tetramethylene glycol), and various polyesters such as caprolactam, hydrodyl-containing acrylates and hydroxyl-containing methacrylates.

Such elastomers may be combined in their unaltered form with the aforementioned thermoplastic resin modified for radiation-sensitization. The elastomer may be used more effectively, however, when it is modified for radiation-sensitization by reaction with an acrylic double bond capable of reacting with the isocyanate group or hydroxyl group at the terminal of the polyurethane elastomer or with a monomer possessing such a acrylic double bond.

(2) Acrylonitrile-butadiene copolymer elastomers

The acrylonitrile-butadiene copolymer prepolymer having terminal hydroxyl groups produced by Sinclare Petrochemical Corp. and marketed under trademark designation of Poly-BD Liquid Resin and the elastomers produced by Nippon Seon Co., Ltd. and amrketed under trademark designations of Hiker 1432J, etc. are particularly suitable as elastomer components because of double bonds in their butadiene moieties are capable of generating radicals and inducing cross-linking and polymerization upon exposure to radiation.

(3) Polybutadiene elastomers

Low molecular weight prepolymers having terminal hydroxyl groups produced by Sinclare Petrochemical Corp. and marketed under trademark designations of Poly-BD-Liquid Resin R-15, etc. are highly suitable in terms of compatibility with thermoplastic resins. In the prepolymer, R-15, since a hydroxyl group forms the terminal of the molecule, this prepolymer can be made to acquire improved sensitivity to radiation by addition of any acrylic unsaturated double bond to the molecular terminal. The prepolymer thus modified proves more advantageous as a binder.

Further, the cyclized polybutadiene (produced by Japan Synthetic Rubber Co., Ltd. and marketed under trademark designation of CBR-M 901) manifests an outstanding behavior when properly combined with a thermoplastic resin. Specifically, the cyclized polybutadiene has a high capacity for inducing cross-linking and polymerization with unsaturated bond radicals upon exposure to radiation, a property inherent in polybutadiene. Thus, it enjoys an outstanding quality as a binder.

In the class of other thermoplastic elastomers and their prepolymers, preferred members are elastomers such as styrene-butadiene rubber, chlorinated rubber, acrylic rubber, isobutylene rubber and cyclization products thereof (such as the product of Japan Synthetic Rubber Co.,m Ltd. marketed under trademark designation of CIR 701), epoxy-modified rubber, and internally plasticized saturated linear polyester (such as the product of Toyo Spinning Co., Ltd. marketed under trademark designation of Byrol #300). They may be effectively utilized when they are treated for radiation-sentizing modification.

These elastomers or prepolymers may be incorporated in an amount of not more than 30 parts by weight, preferably 5 to 20 parts by weight, most preferably 5 to 10 parts by weight to 100 parts by weight of the aforementioned resin composition.

When a solvent is used in the preparation of the resin solution for the magnetic paint according to the present invention, it can be selected from the group consisting of ketones such as acetone, methylethyl ketone, methylisobutyl ketone and cyclohexanone, alcohols such as methanol, ethanol, isopropanol and butanol which have been blocked to prevent reaction with isocyanate type thermosetting binder, ethers such as tetrahydrofuran and dioxane, solvents such as dimethyl formamide, vinyl pyrrolidone and nitropropane, and aromatic hydrocarbon diluents or solvents such as toluene and xylene.

The substrate to which the magnetic paint is applied may be a polyethylene terephthalate type film which is currently utilized widely in magnetic recording media. When the finished magnetic recording medium is intended for an application where it must be heat proof, the substrate may be a polyimide film or a polyamideimide film. Particularly when a polyester type film is adopted as a thin substrate it is often subjected to either monoaxial orientation or biaxial orientation in advance.

The magnetic powder for use in this invention may be selected from among a wide variety of finely divided magnetic powders such as $\gamma$-$Fe_2O_3$, $Fe_3O_4$, Co-doped $\gamma$-$Fe_2O_3$, Co-doped $\gamma$-$Fe_2O_3$-$Fe_3O_4$ solid solution, $CrO_2$, Co type compound-absorbed $\gamma$-$Fe_2O_3$, Co type compound-absorbed $Fe_3O_4$ (inclusive of the intermediate oxide with $\gamma$-$Fe_2O_3$; the term "Co type compound" as used herein means cobalt oxide, cobalt hydroxide, cobalt ferrite, or cobalt ion adsorbate which is capable of effectively utilizing the magnetic anisotropy of cobalt for improvement of coercive force, and combinations formed principally of such ferromagnetic metal elements as Co, Fe-Co, Fe-Co-Ni and Co-Ni. The preparation of the magnetic powder can be effected by the wet reduction method using a reducing agent such as $NaBH_4$ or the method which comprises the steps of treating the surface of iron oxide with a Si compound and then subjecting the treated iron oxide to dry reduction such as with hydrogen gas or to vacuum evaporation under a current of low-pressure argon gas. Finely divided single crystal barium ferrite can be also used.

The finely divided magnetic powder may be formed of needle-shaped particles or granular particles. The choice between these two forms is made according to the nature of the use to which the finished magnetic recording medium is put. The needle-shaped particles of the powder preferably have an average major axis of 0.1 to 1 $\mu$m and an average minor axis of 0.02 to 0.1 $\mu$m. The granular particles of the powder preferably have an average particle diameter of 0.01 to 0.5 $\mu$m. The finely divided magnetic powder is incorporated in an amount of 200 to 900% by weight, preferably 250 to 700% by weight, based on the total amount of the aforementioned resin.

The aforementioned resin composition and the magnetic powder are throughly kneaded and dispersed in a suitable device such as, for example, a ball mill, a sand grind mill, a roll mill, a high-speed impeller dispersion machine, a homogenizer or a supersonic-wave dispersion machine, to produce a magnetic paint. This magnetic paint is applied by an ordinary method to a nonmagnetic substrate. The thickness of the applied layer of the paint is 5 to 20 $\mu$m, preferably 0.5 to 10 $\mu$m, on dry basis.

As regards the radiation-sensitive curing type binder to be used for the manufacture of the magnetic recording medium of this invention, various antistatic agents, dispersant, and abradants normally adopted for uses of the nature contemplated herein may be suitably incorporated in addition to those additives specified by this invention for invorporation in the magnetic paint.

As the active energy ray to be used for curing the applied layer of magnetic paint in the present invention, adoption of the electron beam emanating from an electron beam accelerator proves advantageous for the reason given below. Optionally, however, the $\gamma$ ray originating in $Co^{60}$, the $\beta$ ray originating in $Sr^{90}$, or the X ray originating in an X-ray generator may be effectively used.

As the source for radiation, adoption of the aforementioned electron beam accelerator proved particularly advantageous because of the ease with which the dosage of absorbed ray is controlled, the ionization radiation for the introduction into the production line is automatically shielded, and the connection between the various facilities in the production line and the sequence control unit is efected. To date, various electron beam accelerators have been developed, such s the Cockcroft type accelerator, the Van de Graaf type accelerator, the interchangeable transformer type accelerator, the iron core insulation transformer type accelerator and the linear accelerator. They vary one from another mainly in the manner for generating high voltage. Most magnetic recording media intended for general purpose applications have low magnetic layer thicknesses not exceeding 10 microns. The high-speed voltage exceeding 1000 kV normally used in the aforementioned accelerators is not useful in the production of such magnetic recording media. Thus, adpotion of an electron beam accelerator rated for a low accelerated voltage of 300 kV or less suffices for the irradiation contemplated in this invention. This accelerator of such a low accelerated voltage is further advantageous in respect of the cost required for the purchase of shielding device against the ionizing radiation besides the cost of the system itself.

The advantage in terms of the cost of shielding device is indicated in Table 1.

TABLE 1

| Accelerated voltage and thickness of shield | | |
|---|---|---|
| Accelerated voltage (kV) | Shielding material | Shield thickness (cm) |
| 150 | Lead | 0.5 |
| 200 | Lead | 2 |
| 300 | Lead | 3 |
| 500 | Concrete | 85 |
| 750 | Concrete | 115 |
| 1,000 | Concrete | 125 |
| 2,000 | Concrete | 175 |
| 3,000 | Concrete | 190 |

[Source: Report of Radiation Utilization Study Meeting, page 8 (August, 1979 Japan Atomic Energy Forum)]

It is noted from Table 1 that in the electron beam accelerator of not more than 300 kV of accelerated voltage, use of lead plates (3 cm in maximum thickness) as a shield to enclose the entire accelerator tube encircling the site of irradiation will suffice for thorough interception of X-ray leak. Thus, there is no need for erecting an expensive electron ray irradiation chamber exclusively for shielding leaks, and the system itself can be incorporated as one unit in the whole production line for magnetic recording media. Consequently, the drying and curing of magnetic tapes or magnetic sheet with an electron beam can be carried out in a continuous line.

Concrete examples of systems advantageously used in this invention include a low voltage type electron beam accelerator produced by Energy Science, Inc. (ESI) of the United States marketed under trademark designation of Electrocurtain System, an electron beam accelerator produced by RPC Corp. and marketed under trademark designation of Broadbeam System, and a self-shielding type scanning low voltage type electron accelerator produced by Polymer Physik of West Germany. Where the aforementioned applied layer of binder is cured by the use of a low voltage accelerator of 150 to 300 kV, if the dosage of absorbed ray exceeds 5 Mrads, the magnetic recording media for audio and memory applications suffer from aggravated deposition of peeled magnetic film on the recording heads and those for video applications suffer from similar aggravated deposition on the rotary cylinders, both to the extend of impairing the durability of media in the course of use under conditions of high temperature and high humidity. When the dosage of absorbed ray falls in the range of 0.5 to 5 Mrads, the polymerization and the cross-linking caused by the irradiation with the electron ray occur in densities proper for the applied layer of magnetic paint to aquire flexibility and rigidity in suitable balance, exhibit improved resistance to wear due to friction of the magnetic layer against the recording head, and preclude deposition of peeled magnetic film on the head or on the cylinder. Thus, the magnetic recording medium consequently obtained exhibits outstanding performance.

As concerns the cross-linking of the binder in thea applied layer of magnetic paint, it is important that the layer of magnetic paint on the substrate should be exposed to radiation under a current of an inert gas such as nitrogen gas or helium gas. As is often the case with any applied layer containing a magnetic pigment in an extremely high concentration, the applied layer of magnetic paint inevitably becomes highly porous. If this layer is exposed to the radiation in air, the radiation for inducing the cross-linking of the binder gives rise to ozone in the air and, as the result, the radicals generated in the polymer are impeded by this ozone from effectively fulfilling their function of causing the corss-linking reaction. The ozone has its adverse effect not simply on the surface of the applied layer of magnetic paint but equally on the deep interior of the applied layer because of the porosity of texture. This impedes the progress of the cross-linking of the binder. Thus, it is important that the immediate atmosphere enclosing the site of irradiation with the active energy ray should be filled with an inert gas such as nitrogen gas, helium gas or carbon dioxide gas having the highest tolerable oxygen concentration of 1%, perferably not more than 3,000 ppm.

Now, the present invention will be described more specifically below with reference to a working example.

EXAMPLE 1 AND CONTROLS 1-2

An autoclave was charged with 130 parts by weight of vinyl chloride, 70 parts by weight of vinyl acetate, 105 parts by weight of methylethyl ketone, 45 parts by weight of toluene and 2 parts by weight of benzoyl peroxide, and it was heated at 55° C. to induce polymerization of the monomers. When the conversion of vinyl chloride-vinyl acetate reached 10%, one sixth of a mixed solution containing 1.5 parts by weight of maleic anhydride, 4.5 parts by weight of maleic acid and 30 parts by weight of methylethyl ketone was added to the reaction system. The reamining five sixths of the mixed solution was added piecemeal over the period during which the aforementioned conversion rose from 10% to 60%. After the polymerization was continued until the conversion rose to 90%, the reaction system was cooled. The resin solution having a resin content of about 50% by weight consequently obtained in the autoclave was taken out. By analysis, this resin was found to be a copolymer containing 70 parts by weight of vinyl chloride, 30 parts by weight of vinyl acetate, 0.7 parts by weight of maleic anhydride and 2.3 parts by weight of maleic acid and having a polymerization degree of 250. This copolymer solution will be called Solution A.

0.3 Parts by weight of allyl alcohol to 100 parts by weight of Solution A (calculated as solids) was added to Solution A to produce Solution B.

In a ball mill, the components described below were mixed for three hours to cause the needle-shaped particles of magnetic iron oxide to become thoroughly wetted with the dispersant.

Cobalt-coated needle-shapted particles of $\gamma$-Fe$_2$O$_3$ (major axis 0.5 $\mu$m, minor axis 0.05 $\mu$m, Hc 600 Oe): 120 parts by weight.
Carbon black (antistatic grade, Mitsubishi Carbon Black MA 600): 5 parts by weight.
Powdered $\alpha$-Al$_2$O$_3$ (average particle diameter 0.5 $\mu$m): 2 parts by weight.
Dispersant (lecithin isoloated from soybean oil): 3 parts by weight.
Solvent (methylethyl ketone/toluene: 50/50): 100 parts by weight.

Then, the following components were thoroughly mixed and dissolved.

Solution A (calculated as solids) (polymerization degree about 250): 6 parts by weight.
Solution B (calculated as solids): 9 parts by weight.
Polyether urethane elastomer incorporating acrylic double bond (calculated as solids): 15 parts by weight.
Solvent (methylethyl ketone/tolune: 50/50): 200 parts by weight.
Fatty acid ester (butyl myristate): 2 parts by weight.
Fatty acid (myristic acid): 1 part by weight.

The resultant solution was added to the ball mill used for the treatment of the magnetic powder and again was mixed and disposed for 42 hours.

The magnetic paint thus obtained was applied to the surface of a polyester film 15 $\mu$m in thickness, oriented over a permanent magnet (1,600 gausses), dried with an infrared ray lamp or hot air to expel the solvent, treated to smoothen the surface, and irradiated with an electron beam using an electron curtaint type electron beam accelerator of ESI under the conditions of 150 kV of accelerated voltage, 10 mA of electrode current, and 5 Mrad of dosage under a blanket of nitrogen gas having a residual concentration of 500 ppm to effect polymerization desiccation and curing of the applied layer of magnetic paint.

The tape thus obtained was cut into strips of a width of ½ inch to produce video tapes. The video tapes thus obtained were tested for various properties. The results were as shown in Table 2.

For comparison, the procedures were repeated, except that neither Solution A or Solution B were in Control 1 and only Solution B was contained in Control 2. The results of this comparative test are also shown in Table 2.

TABLE 2

| Physical property | Control 1 | Control 2 | Example 1 |
|---|---|---|---|
| Friction coefficient | 0.3 | 0.25 | 0.20 |
| Gloss (%) | 100 | 105 | 150 |
| Electromagnetic conversion Property (dB) | 0 | 0 | +1.8 |

The friction coefficient ($\mu$) was determined by winding a given magnetic tape on a friction cylinder, running the tape, measuring the inlet tension $T_o$ and the outlet tension $T_i$ of the tape in motion, and applying the results of the measurement to the following Euler's formula.

$$\mu = (1/\theta) \cdot \ln(T_i/T_o)$$

(wherein $\theta$ stands for the angle of winding (rad.) and ln for the natural logarithm).

The gloss was determined by projection a beam of light at 60° of incident angle upon the magnetic side of a given tape, measuring the reflected beam of light, and calculating the ratio of the volumes of incident light, and reflected light. It was, therefore, reported by this ratio expressed in percent. The data of gloss shown in Table 2 are numerical values of the relative levels of rating of the samples, with the gloss of the sample of Example 1 taken as 2 (200%).

The data of electromagnetic conversion property are values (dB) measured with a VHS video deck at RF sensitively of 4 MHz and computed based on the property of the sample of the comparative test taken as 0 dB.

Similar video tapes were prepared by varying the ratio (dry content) of Solution A and Solution B, and the capacity for orientation was measured to obtain the graph as shown in the drawing.

EXAMPLE 2 AND CONTROLS 3-4

A video tape was obtained by following the procedure of Example 1, except that magnetic powder of Fe-Co-Ni alloy (major particle diameter 0.3 $\mu$m, minor particle diameter 0.04 $\mu$m, Hc 1,200 Oe) was used in the place of said cobalt-coated needle-shaped $\gamma$-FeO$_3$ particles and a mixed solvent of methylethyl ketone/toluene (52/48) was used as a solvent.

The video tape thus produced was tested for various properties. The results were as shown in Table 3. By way of comparison, video tapes were obtained by using a formulation containing neither Solution A nor B solution (Control 3) and a formulation containing only Solution A were subjected to the same test as described above.

TABLE 3

| Physical properties | Control 3 | Control 4 | Example 2 |
|---|---|---|---|
| Frictional coefficient | 0.27 | 0.22 | 0.32 |
| Gloss | 100 | 103 | 150 |
| Electromagnetic conversion property (dB) | 0 | 0 | +1.5 |

What is claimed is:

1. A magnetic recording medium produced by
   A. modifying a four component copolymer of (A) vinyl chloride, (B) a vinyl carboxylate, (C) an unsaturated carboxylic acid and (D) an unsaturated carboxylic anhydride, containing 50 to 80% by weight of (A) based on the total of (A) and (B), 10 to 30% by weight of (D) based on the total of (C) and (D) and a total of 1 to 5 parts by weight of (C) and (D) based on 100 parts by weight of (A) and (B) and having an average polymerization degree of 100 to 400 with a radiation polymerizable monomer to produce a radiation sensitive curing copolymer, B. mixing the radiation sensitive curing polymer with another polymer which is not radiation sensitive to produce a polymer mixture containing from 10% to 80% by weight of the radiation copolymer,
   C. mixing the polymer mixture resulting from Step B with a magnetic powder to produce a magnetic paint,
   D. applying the magnetic paint to a non-magnetic substrate, and
   E. exposing resulting coating to radiation thereby curing the polymer mixture.

2. A magnetic recording medium according to claim 1 wherein the other polymer of Step B is a vinyl chloride type copolymer.

3. A magnetic recording medium according to claim 1 wherein the amount of said magnetic powder is from 200 to 900% by weight based on the total amount of polymer mixture.

4. A magnetic recording medium according to claim 1 wherein the amount of (A) vinyl chloride is 60 to 80% by weight based on the total amount of (A) and (B) and the amount of (D) is 1 to 3% by weight based on the total of the amounts of (C) and (D).

5. A magnetic recording medium according to claim 4 wherein the total of the amount of (C) said unsaturated carboxylic acid and (D) said unsaturated carboxylic anhydride is 1 to 5 parts by weight based on 100 parts by weight of the total of the amounts of (A) said vinyl chloride and (B) said vinyl carboxylate.

6. A magnetic recording medium according to claim 1 wherein (B) said vinyl carboxylate is at least one member selected from the group consisting of vinyl acetate, vinyl propionate and Vinyl Versatate, (C) said unsaturated carboxylic acid is at least one member selected from the group consisting of maleic acid, itaconic acid, fumaric acid, acrylic acid and methacrylic acid and (D) said unsaturated carboxylic anhydride is at least one member selected from the group consisting of maleic anhydride and itaconic anhydride.

7. A magnetic recording medium according to claim 6 wherein (B) said vinyl carboxylic is vinyl acetate, (C) said unsaturated carboxylic acid is maleic acid and (D) said unsaturated carboxylic anhydride is maleic anhydride.

8. A magnetic recording medium according to claim 1 wherein said applied layer of magnetic paint has a thickness of 0.5 to 20 $\mu$m on dry basis.

9. A magnetic recording medium according to claim 8 wherein said non-magnetic substrate is a polyethylene terephthalate film.

* * * * *